United States Patent

Ramaswamy

[11] Patent Number: 5,897,624
[45] Date of Patent: Apr. 27, 1999

[54] ENHANCED (R,S,S) POLICY FOR PERIODIC REVIEW SINGLE-ITEM INVENTORY CONTROL

[75] Inventor: Sanjay Elathur Ramaswamy, Elmsford, N.Y.

[73] Assignee: International Business Machines Corporation, Armonk, N.Y.

[21] Appl. No.: 08/898,749

[22] Filed: Jul. 23, 1997

[51] Int. Cl.⁶ .................................................. G06F 17/60
[52] U.S. Cl. ............................... 705/28; 705/10; 705/29
[58] Field of Search .................... 364/468.06, 468.07, 364/468.13, 468.14; 705/28, 29, 7, 8, 10

[56] References Cited

U.S. PATENT DOCUMENTS 4,383,298   5/1983   Huff et al. ................................. 705/28
5,699,259  12/1997   Colman et al. ........................... 705/28

OTHER PUBLICATIONS

Edward A. Silver and Rein Peterson, Decision Systems for Inventory Management and Production Planning, John Wiley & Sons, pp. 256–260, Mar. 21, 1985.

Carl R. Schultz, "Replenishment delays for expensive slow–moving items," Management Science, vol. 35, No. 12, pp. 1454–1462, Dec. 1, 1989.

Primary Examiner—Eric W. Stamber
Assistant Examiner—John Campa
Attorney, Agent, or Firm—Whitham, Curtis, Whitham; Stephen C. Kaufman

[57] ABSTRACT

A computer implemented method provides decision support for how much of an inventory item to order and when to order where the review period is different from a basic time unit for demand realization and updates. For cases where the review period is greater than the basic time unit for describing the system, the (s,S) rule is replaced with an enhanced policy for deciding when to order and how much to order. This policy becomes necessary as in practice items are often reviewed at different frequencies, even though demand realization and inventory updates may be done every day. Given a periodic review inventory system and given a set of (s,S) values, the computer implemented method produces lower average inventory costs for the same achieved service level. Alternatively, for a given average investment in inventory, the method will result in higher service level than the corresponding (s,S) policy.

7 Claims, 3 Drawing Sheets

ENHANCED (R,S,S) POLICY FOR PERIODIC REVIEW SINGLE-ITEM INVENTORY CONTROL

BACKGROUND OF THE INVENTION

1. Field of the Invention

The present invention generally relates to computer software for business management and, more particularly, to a computer implemented method which provides decision support in the form of an enhanced (R,s,S) policy for periodic review single-item inventory control system when the review period is different from the basic time unit for demand realization and updates.

2. Background Description

The system under consideration manages the inventory level of an item, where at recurring intervals called the review period, the inventory level is reviewed and if necessary purchase orders are placed to replenish depleted inventory, in accordance with a pre-specified decision rule. An (R,s,S) inventory policy is one such decision rule that specifies that an order be placed when the level of inventory on hand plus on order falls below the levels (a specified number), and the amount of order be the difference between S (another specified number) and the present level of inventory on hand plus on order; i.e., every time the inventory position (which refers to the sum of inventory on hand plus on order) falls below s, an order is placed to bring it up to S.

For a periodic review inventory system, when the review period is different from the basic time unit for demand realization and updates, the (R,s,S) Policy is no longer optimal. What is needed is an alternate, improved method to decide how much to order and when to order.

SUMMARY OF THE INVENTION

It is therefore an object of the invention to provide a computer implemented method for deciding how much of an inventory item to order and when to order where the review period is different from a basic time unit for demand realization and updates.

According to the invention, for cases where the review period is greater than the basic time unit for describing the system (e.g., if the time unit for lead time, forecasting, etc., is in weeks, and the review period is four weeks), the (R,s,S) rule is replaced with an enhanced policy for deciding when to order and how much to order. This policy becomes necessary as in practice items are often reviewed at different frequencies, even though demand realization and inventory updates may be done every day.

Given a periodic review inventory system as described above, and given a set of (R,s,S) values, the computer implemented method of the present invention produces lower average inventory costs for the same achieved service level. Alternatively, for a given average investment in inventory, the method will result in higher service level than the corresponding (R,s,S) policy. The policy is new in that it is not available as part of the existing literature on periodic review (R,s,S) policies. The usefulness of the policy in increasing the accuracy of achieved service levels has been demonstrated with test data by comparison with the existing inventory algorithm in INFOREM, a commercially available inventory package from International Business Machines Corporation (IBM).

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
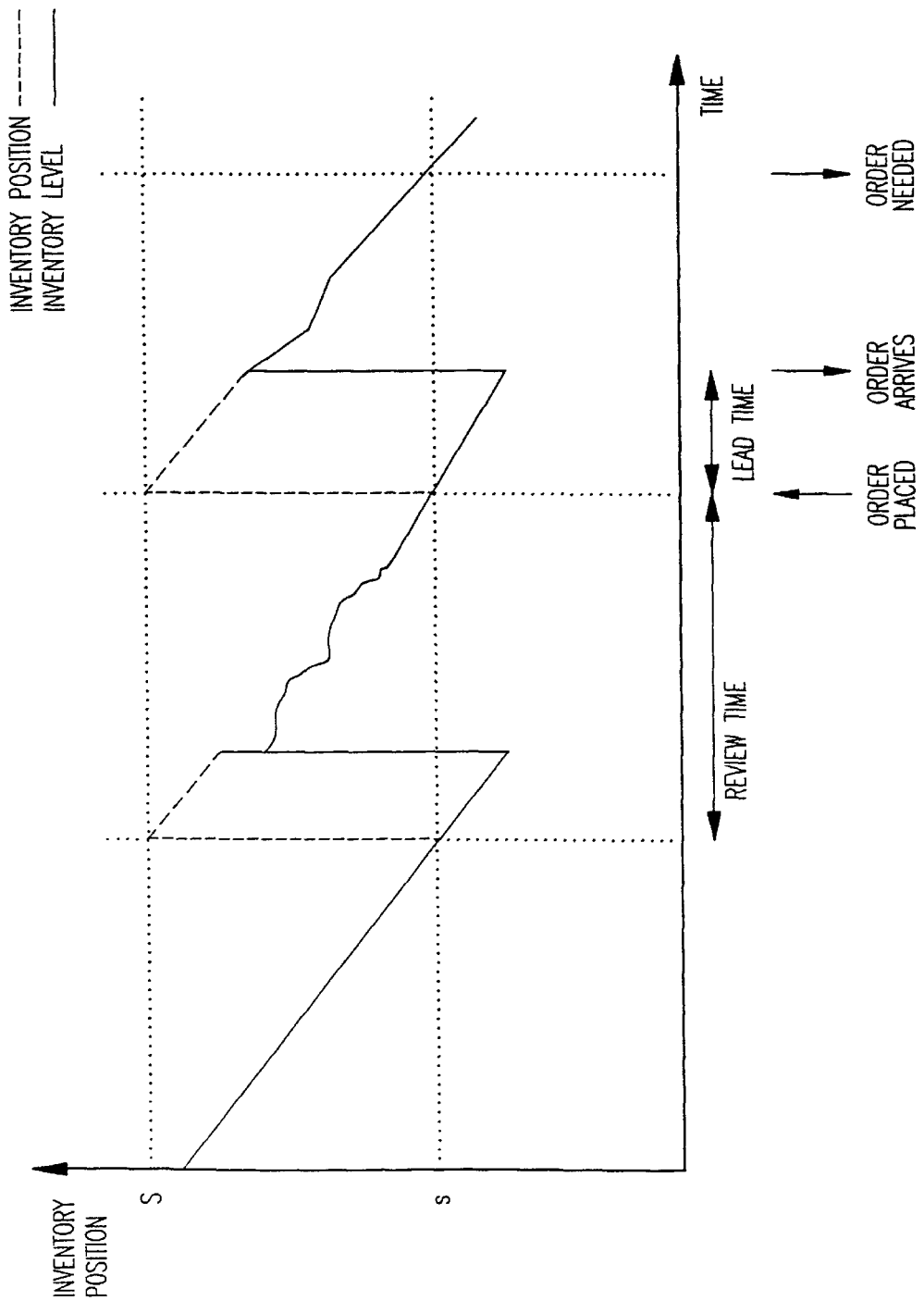
FIG. 1 is a graph illustrating a periodic review (R,s,S) inventory system.

Referring to FIG. 1, the basic idea behind the enhancement according to the invention is to overcome the problem caused by reviewing the inventory periodically as opposed to continually. When the review period is different from the basic time unit for demand realization and updates, the (R,s,S) policy is no longer optimal. The situation is illustrated in FIG. 1, where a periodic review inventory system with lead times less than the review time is shown.

It should be noted that an order needs to be placed while there is at least enough safety stock to cover the exposure during lead time plus review time. This is because if the current opportunity to order is missed, the earliest possible time an order can be placed is at the next review period, and the earliest time that an order can arrive is another lead time units later. See E. A. Silver and R. Peterson, *Decision Systems for Inventory Management and Production Planning*, John Wiley & Sons (1985), for further explanations.

While this is true about order placement, it is also true that an order placed at this time will arrive after a lead time, whereas there is enough safety stock in the system to cover exposure for the sum of lead time plus some length of review time, depending on how far below the reorder point the stocks have fallen at the time of order placement. Thus, orders arrive earlier than they are needed, resulting in higher average inventory levels for the same performance.

It can now be seen that given any (R,s,S) value for such a periodic review system, there exists the opportunity to reduce average inventory holding while maintaining the same service level by introducing a delay in the order placement activity. The enhanced (R,s,S) algorithm implemented according to the present invention does exactly that by calculating a suggested delay in order placement at the time of review, in addition to the recommended order quantity.

Earlier work pertaining to delayed ordering can be found in C. R. Schultz, "Replenishment delays for expensive slow-moving items", *Management Science*, 35, 12, pp. 1454–1462, 1989, and K. Katircioglu and D. Atkins, "New Optimal policies for a unit demand inventory problem", Working Paper, Faculty of Commerce and Business Administration, University of British Columbia, Vancouver (1996). Both Schultz et al. and Katircioglu et al. study continuous review inventory systems. In Schultz et al., the problem of unit demand arrivals as in the case of slow moving items is considered, where a single unit of item is held in inventory and whenever it is sold, a shipment of the replenishment is scheduled at a future time including a possible delay. In Katircioglu et al., the model allows any amount to be held as stock, assumes full backlogging of unsatisfied demand, but still deals with a continuous review model of unit demand arrival.

The present invention differs fundamentally from the above literature in that a periodic review system is considered, and the delay is calculated primarily to overcome the problem of periodic reviews.

Figure 2:
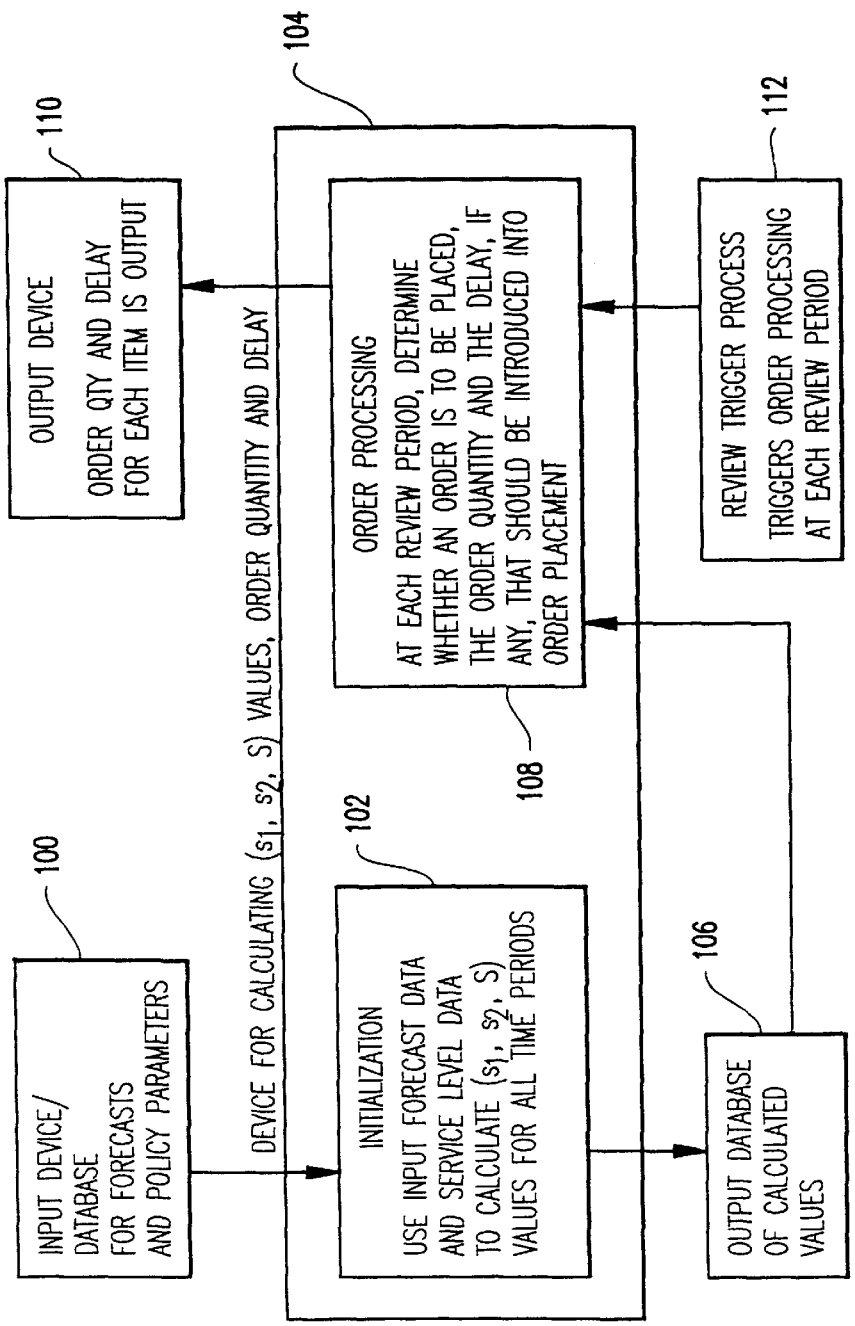
FIG. 2 is a block diagram of a system for carrying out the computer-implemented method of the present invention.
Figure 3:
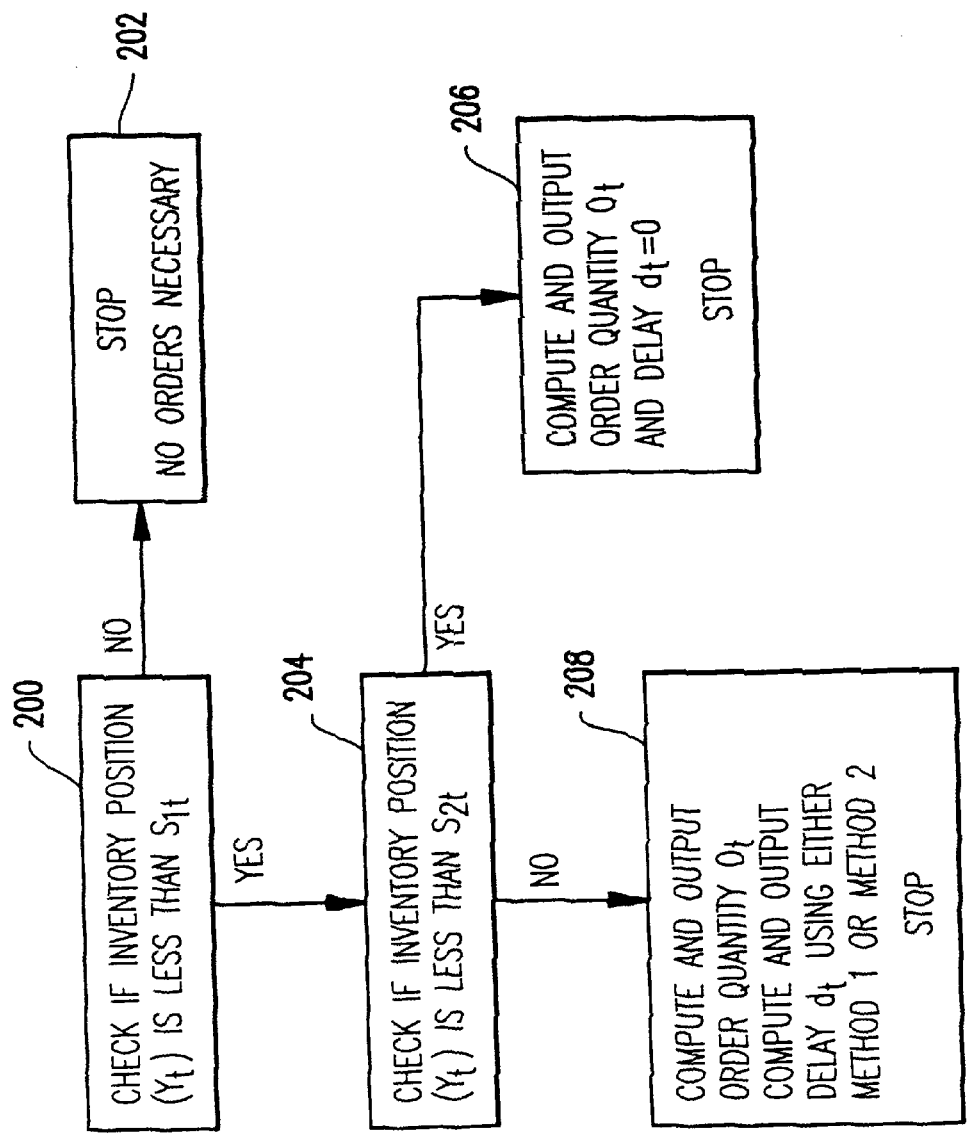
FIG. 3 is a flow diagram showing an example embodiment of the process block in FIG. 2 for calculating an order quantity and delay according to the present invention.

Referring to FIGS. 2 and 3, an example method according to the invention and a computer system for implementation, will be described with an example pseudo-code for carrying out its processing steps.

The following notation will be used for this description:

t=1,2, . . . T Time Horizon
R=Review Period length, in integer multiples of t
L=Mean Lead Time for the item
$Y_t$=Inventory Position at time t
$W_t$=Inventory Level at time t
$D_t$=Realized Demand at time t
$S_t$=Specified Order Up to Level
$s1_t$=first reorder point
$s2_t$=second reorder point
$O_t$=Order quantity at time t
$d_t$=delay for order placed at time t
$FM_t$=Forecast mean demand over lead time plus review period starting at time t (Sum of unit forecast demand from period t through t+R+L−1)
$FSD_t$=Forecast standard deviation over lead time plus review period starting at time t (Square root of sum of forecast variance from period t through t+R+L−1)
$FML_t$=Forecast mean demand over lead time (Sum of unit forecast demand from period t through t+L−1)
$FSDL_t$=Forecast standard deviation over lead time (Square root of sum of forecast variance from period t through t+L−1)
k=safety factor Consider an inventory system where at every time period demand $D_t$ is realized and the inventory level and position are updated. Further, after every R periods, the inventory position is reviewed against a set of policy parameter ($S_t$, $s1_t$, and $s2_t$), and an ordering decision made according to the Enhanced (R,s,S) policy specified below.

First, as shown in FIG. 2, an input device and database 100 for inputting and storing forecasts and policy parameters is connected to an initialization block 102 within a calculation device 104. As will be described, the calculation device 104 calculates $s1_t$, $s2_t$ and $S_t$ values, order quantity $O_t$ and delay $d_t$.

The initialization block 102 receives from the input device and database 100 forecast values over the time horizon and the inventory policy parameters which have been input by the user. The initialization block 102 then calculates the $s1_t$, $s2_t$ and $S_t$ values for t=1 to T, and stores the results in an output database of calculated values 106. The initialization block 102 recalculates the $s1_t$, $s2_t$ and $S_t$ values whenever there is a change in either the forecast or the relevant policy parameters for an item.

The order processing block 108 takes as input the calculated values from the database 106 and determines both the order quantity and the delay for use in placing orders. The order quantity and delay values are output to an output device 110, which may be either an apparatus for generating a printed order or a database for future retrieval and use. The order processing block executes its processing for determining order quantity and delay at each review period, which is generated by the review trigger process 112.

An example operation sequence to carry out the initialization block 102 is described by the following commented pseudo-code, with comments bracketed as { }:

For t=1,2, . . . T {start of block 102}

$FM_t$, $FSD_t$, $FML_t$, and $FSDL_t$ are pre-calculated using the forecast data;

Again, for t=1,2, . . . T, the policy parameters ($s1_t$, $s2_t$, and $S_t$) are calculated as follows $s1_t = FM_t + kFSD_t$;
$s2_t = FML_t + kFSDL_t$, {end of block 102} where the safety factor k is calculated depending on the service level specified by the user data from the input device/database 100, and the order-up-to quantity $S_t$ (>$s1_t$, $s2_t$) is either a pre-specified quantity from the input device/database 100 or is calculated by adding the order quantity (again, either prespecified or calculated otherwise) to $s1_t$.

The $s1_t$, $s2_t$ values calculated above are output to the database 106 as described above.

Next, with a periodicity determined by the review trigger process 112, the order processing block 108 determines whether an order, $O_t$, is to be placed and the delay, $d_t$, if any, that should be introduced into the order placement. The processing within block 108 is shown by the block diagram of FIG. 3.

Referring to FIG. 3, at block 200, for each ordering period t=R,2R, . . . T/R, the process determines if the inventory position $Y_t$ is less than $s1_t$. If the inventory position $Y_t$ is not less than $s1_t$, no order is necessary and the process goes to block 202 and stops. If, on the other hand, $Y_t$ is less than $s1_t$ the process goes to block 204 to determine if $Y_t$ is less than $s2_t$.

If block 204 determines the inventory position is less than $s2_t$ the process goes to block 206 to compute the order quantity $O_t$, and sets the delay $d_t$=0.

If block 204 determines that the inventory position is greater than $s2_t$ the process goes to block 208, which calculates the order quantity $O_t$ and delay $d_t$, where the delay $d_t$ is calculated using either method 1 or method 2, and stops.

An example commented pseudo-code for carrying out the process flow of FIG. 2 block 108, for calculating the order quantity Ot and delay $d_t$ according to the FIG. 3 detail flow:

```
{Block 108 start}
If (Y_t< sl_t)  {Block 200, check if inventory
                 position Y_t is less than sl_t.}
     then                  {If "yes" go to block 204}
     if (Y_t<s2_t)    {At 204 check if Y_t is below s2_t
          O_t=S_t-Y_t;      requirement over lead time.
          d_t=0;            If "yes", go to block 206
                            and compute order quantity
                            O_t, set delay d_t =0,as
                            order needs to be placed
                            immediately.}
     else                   {If "no" at block 204, Yt is
          Dt=Computedt( );  greater s2t requirement over
          Ot=St-Yt;         lead time, go to block 208
                            which computes the delay dt
                            by "Computedt( )" pseudo-code
                            below and computes the
                            order quantity Ot.)
else {No orders are necessary if block 200    determines that Yt is
greater than s1t}
  return;
Computedt( ) {This is the block 208 computation of
              delay dt, and can be done in either
              of two methods, termed "Method 1" and
              "Method 2", which are described
              below. Selection of methods may be
              performed by simple code based on
              the following criteria: If
              forecasted demand variability within
              the review period R is small or R is
              small, use Method 1. If R is large
              and demand is expected to vary
              significantly within this time use
```

```
            Method 2.}
        {Method 1 - quick approximation}
            dt=round (R*(Yt-s2t)/(slt-s2t);
            return dt;
        {end of Method 1}
    else {Method 2 - slower}
            dt=0;
            i=t;
            BYt = Yt;
            do while (BYt>=slt)
                dt=dt+1;
                BYt=BYt-FMi;
                i=i+1; {end of do while}
        {end of Method 2}
{End of block 108}
```

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer-implemented method for calculating an order quantity and a delay value for placing an order in an (R,s,S) policy inventory control system, comprising the steps of:

inputting a plurality of forecast data representing a statistical demand for an inventory item over a time duration, and inputting a service level data representing a statistical standard for an inventory position;

calculating a series of first and second reordering points, and a series of order-up-to points for a plurality of time periods within said time duration, based on said input forecast data and service level data;

for each of said plurality of time periods, detecting the inventory position and, if the inventory position is below the first reorder point for the time period then
    if the inventory position is below the second reorder point for the time period, computing an order quantity based on said inventory position and the order-up-to-point for the time period, and if the inventory position is above the second reorder point, computing an order quantity and a delay value, said delay value being computed based on at least said inventory position and said second reorder point, wherein said order quantity and delay values are used in generating orders for said inventory item.

2. A computer-implemented method for calculating an order quantity and a delay value according to claim 1, wherein the computing of a delay value includes the steps of:

subtracting the second reordering point from the detected inventory position for the time period;

dividing a result of said subtracting by a difference between said first reordering point and said second reordering point; and multiplying a result of said subtracting and dividing steps by a value representing a time period for reviewing the inventory position.

3. A computer-implemented method for calculating an order quantity and a delay value according to claim 2, wherein the computing of a delay value further includes the step of rounding a result of said multiplying to a predetermined rounding precision.

4. A computer-implemented method for calculating an order quantity and a delay value according to claim 1, wherein the plurality of time periods are indexed by a value t, and wherein the computing of a delay value includes the steps of:

initializing the delay value $d_t=0$;

setting index i=t;

initializing $BY_t=Y_t$;

repeating steps (a) through (c) while $(BY_t>=s1_t)$
  (a) $d_t=d_t+1$;
  (b) $BY_t=BY_t-FM_i$; and
  (c) i=i+1, where $BY_t$ is a computer loop control variable, $FM_i$ is a datum from the plurality of forecast data, and sit is the first reordering point for time period t.

5. A computer-implemented method for calculating an order quantity and a delay value according to claim 1, wherein the plurality of time periods are indexed by a value t, and wherein the plurality of forecast data representing a statistical demand for an inventory item over a time duration includes a series labeled as $FM_t$ of forecast mean demand data over a lead time plus said time period, a series labeled as $FSD_t$ of forecast standard deviation data over the lead time plus the time period, a series labeled as $FML_t$ of forecast mean demand over the lead time, and a series labeled as $FSDL_t$ of forecast standard deviation over the lead time, and wherein said step of calculating a series of first and second reordering points and a series of order-up-to points comprises the steps of:

$s1_t=FM_t+(k \times FSD_t)$, and $s2_t=FML_t+(k \times FSDL_t)$, where $s1_t$ is the first reordering point and $s2_t$ is the second reordering point for the time period t, and where k is a safety factor based on said input service level.

6. A computer-implemented method for calculating an order quantity and a delay value according to claim 1, wherein said step of calculating a series of first and second reordering points and a series of order-up-to points for a plurality of time periods within said time duration includes inputting a series of predetermined order-up-to points $S_t$.

7. A computer-implemented method for calculating an order quantity and a delay value according to claim 1, wherein the step of calculating a series of first and second reordering points and a series of order-up-to points for a plurality of time periods within said time duration includes inputting a series of predetermined order quantities $O_t$, and wherein said calculating a series of order-up-to points is according to $$S_t=S1_t+O_t,$$

where sit is the first reordering point and $S_t$ is the order-up-to point for a time period t.

* * * * *